United States Patent
Hirano et al.

(10) Patent No.: US 11,225,560 B2
(45) Date of Patent: Jan. 18, 2022

(54) PREFORM FOR FIBER-REINFORCED COMPOSITE MATERIAL, THERMOSETTING RESIN COMPOSITION, FIBER-REINFORCED COMPOSITE MATERIAL, AND METHOD OF PRODUCING FIBER-REINFORCED COMPOSITE MATERIAL

(71) Applicant: Toray Industries, Inc., Tokyo (JP)

(72) Inventors: Masanori Hirano, Nagoya (JP); Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 146 days.

(21) Appl. No.: 16/611,314

(22) PCT Filed: Jun. 5, 2018

(86) PCT No.: PCT/JP2018/021505
§ 371 (c)(1),
(2) Date: Nov. 6, 2019

(87) PCT Pub. No.: WO2019/003824
PCT Pub. Date: Jan. 3, 2019

(65) Prior Publication Data
US 2020/0165398 A1    May 28, 2020

(30) Foreign Application Priority Data

Jun. 30, 2017 (JP) .............................. JP2017-128608

(51) Int. Cl.
*C08J 5/24* (2006.01)
*B29C 70/46* (2006.01)
*B29K 101/10* (2006.01)
*B29K 105/00* (2006.01)
*B29K 105/08* (2006.01)
*B29K 307/04* (2006.01)

(52) U.S. Cl.
CPC .............. *C08J 5/24* (2013.01); *B29C 70/465* (2013.01); *B29K 2101/10* (2013.01); *B29K 2105/0014* (2013.01); *B29K 2105/0845* (2013.01); *B29K 2307/04* (2013.01); *B29K 2995/0041* (2013.01); *C08J 2335/02* (2013.01); *C08J 2363/00* (2013.01); *C08J 2371/10* (2013.01); *C08J 2463/00* (2013.01)

(58) Field of Classification Search
CPC ........ B29K 2995/0041; B29K 2307/04; B29K 2105/0014; B29K 2105/0845; B29K 2101/10; B29C 70/465; C08J 2463/00; C08J 2371/10; C08J 2335/02; C08J 2363/00; C08J 5/24; C08J 5/04; C08J 5/042
USPC ........ 523/211, 200; 156/327, 330, 166, 320, 156/245; 428/297.4, 367, 425.6; 525/934, 65, 523, 107; 264/331.11, 511; 442/93
See application file for complete search history.

(56) References Cited

FOREIGN PATENT DOCUMENTS

| | | |
|---|---|---|
| JP | 62-240375 A | 10/1987 |
| JP | 03-29098 B2 | 4/1991 |
| JP | 10-305529 A | 11/1998 |
| JP | 2005-298713 A | 10/2005 |
| JP | 2009-263493 A | 11/2009 |
| JP | 2012-021112 A | 2/2012 |
| JP | 2012-077306 A | 4/2012 |
| JP | 5315057 B2 | 7/2013 |
| JP | 2014-231588 A | 12/2014 |
| JP | 2016-065164 A | 4/2016 |

OTHER PUBLICATIONS

Knowde, Mitsubishi Chemical, jER YX4000 material datasheet, accessed online May 26, 2021.*

* cited by examiner

*Primary Examiner* — Camie S Thompson
(74) *Attorney, Agent, or Firm* — DLA Piper LLP (US)

(57) ABSTRACT

A preform for fiber rein-forced composite material producing includes a thermosetting resin composition and a dry reinforcing fiber base, the thermosetting resin composition characterized in that when subjected to dynamic viscoelasticity measurement at a traction period of 0.5 Hz while heating at a rate of 1.5° C./min, a temperature change $\Delta T$ is 45° C. or less as complex viscosity $\eta^*$ decreases from $1\times10^7$ Pa·s to $1\times10^1$ Pa·s.

13 Claims, No Drawings

PREFORM FOR FIBER-REINFORCED COMPOSITE MATERIAL, THERMOSETTING RESIN COMPOSITION, FIBER-REINFORCED COMPOSITE MATERIAL, AND METHOD OF PRODUCING FIBER-REINFORCED COMPOSITE MATERIAL

TECHNICAL FIELD

This disclosure relates to a thermosetting resin composition for use in fiber reinforced composite materials, a preform, and a fiber reinforced composite material produced therefrom, and a method of producing the fiber reinforced composite material.

BACKGROUND

Fiber reinforced composite materials made of reinforcing fibers and matrix resins allow material designs that make use of advantages of the reinforcing fibers and the matrix resins so that their use is being expanded to not only the aerospace field but also the field of sports, the field of general industry and the like.

As the reinforcing fibers, glass fiber, aramid fiber, carbon fiber, boron fiber are used. Furthermore, as the matrix resins, both thermosetting resins and thermoplastic resins are used, but thermosetting resins that can easily impregnate the reinforcing fiber are often used. As the thermosetting resins, epoxy resins, unsaturated polyester resins, vinyl ester resins, phenol resin, bismaleimide resins, cyanate resins and the like are used.

For the production of fiber reinforced composite materials, methods such as a prepreg process, a hand layup process, a filament winding process, a pultrusion process, a RTM (resin transfer molding) process, a film bag molding process, and a press molding process are generally applied. When high productivity is required, the use of the RTM process, film bag molding process, or press molding process is preferred.

Among others, demands for fiber reinforced composite materials such as carbon fiber reinforced composite materials are increasing in recent years particularly in the fields of aircraft and automobile manufacturing. For these applications, fiber reinforced composite materials that are small in required cost and environment load are now called for to realize their use for more general purposes.

The above matrix resins used for the conventional processes of producing fiber reinforced composite materials are commonly in a liquid or semisolid state at room temperature to permit high performance in impregnating the reinforcing fiber bases. When using such resins in a liquid or semisolid state at room temperature, a large lost occurs because they tend to be left in the resin preparation devices and resin injection devices and, accordingly, those resins in a liquid or semisolid state are difficult to handle. In addition, when applying the prepreg process, for example, a film of the matrix resin is prepared first, and then the resulting film is used to impregnate reinforcing fibers, but secondary materials such as releasable films are often necessary when preparing the resin film, easily leading to increased costs. Furthermore, the addition of large amounts of components that are in a solid state at room temperature is not appropriate to form a resin composition that is in a liquid or semisolid state at room temperature.

In the fields of electric and electronic components, on the other hand, there is a well-known technique in which solid epoxy resin compositions that are high in handleability at room temperature are compression-molded to achieve the sealing of semiconductors. In that technique for semiconductor sealing by compression molding, a semiconductor substrate is attached to the bottom face of the top force of a hot press molding machine whereas a solid epoxy resin composition is introduced to the top face of the bottom force, and clamping of the solid resin composition is performed while melting it to seal the surface of the semiconductor substrate.

Japanese Unexamined Patent Publication (Kokai) No. 2009-263493 discloses a compression moldable semiconductor-sealing epoxy resin composition composed of a crystalline epoxy resin, a phenol novolac curing agent, a curing accelerator, and an inorganic filler and is solid at room temperature.

Japanese Patent No. 5315057 discloses a resin composition designed for producing fiber reinforced composite materials and composed of a crystalline epoxy resin, a crystalline curing agent, and a curing accelerator. This resin composition is a resin composition that is solid at room temperature. Japanese Examined Patent Publication (Kokoku) No. HEI 3-29098 discloses a powdery epoxy resin composition unlikely to suffer from the generation of compositional unevenness after curing, produced by crushing a crystalline epoxy resin that is solid at 30° C. and a solid curing agent, pressure-bonding them, and crushing them again. Japanese Unexamined Patent Publication (Kokai) No. 2005-298713 discloses a resin composition composed of a liquid epoxy resin, a crystalline thermosetting resin, and a curing agent and that is low in tackiness.

The material described in JP '493 cannot work efficiently in impregnating reinforcing fibers since the solid resin cannot melt easily when pressed and heated.

The material described in JP '057 is designed to form a crystalline cured resin and the crystallizable components contained in the resin composition differ significantly among them in melting speed so that the components melted early can infiltrate ahead of others into the fibers. As a result, when that material is used to produce a fiber reinforced composite material, the cured resin tends to suffer from compositional unevenness.

The material described in JP '098 is considered to be little liable to compositional unevenness in the cured resin, but although JP '098 touches on its application to prepregs, there is no description that is conscious of its press molding or the like.

The material described in JP '713 is low in handleability at room temperature.

Thus, it could be helpful to provide a preform that is high in handleability at room temperature and little liable to compositional unevenness when cured, a thermosetting resin composition that works efficiently in impregnating the reinforcing fibers used therefor, and a fiber reinforced composite material produced therefrom.

SUMMARY

We thus provide:
(1) A preform for fiber reinforced composite material production including a thermosetting resin composition and a dry reinforcing fiber base, the thermosetting resin composition being characterized in that when subjected to dynamic viscoelasticity measurement at a traction period of 0.5 Hz while heating at a rate of 1.5° C./min, the temperature change $\Delta T$ is 45° C. or less as the complex viscosity $\eta^*$ decreases from $1\times10^7$ Pa·s to $1\times10^1$ Pa·s.

(2) A preform for fiber reinforced composite material production including a thermosetting resin composition and a dry reinforcing fiber base, the thermosetting resin composition having a single melting point and a heat of fusion of 30 J/g or more.

(3) A thermosetting resin composition for use in a preform for fiber reinforced composite material production as set forth in (1) or (2) to be used for forming a preform for fiber reinforced composite material production that includes a dry reinforcing fiber base.

(4) A fiber reinforced composite material including a reinforcing fiber base impregnated with a thermosetting resin composition as set forth in (3), wherein the thermosetting resin composition is in a cured state.

(5) A method of producing a fiber reinforced composite material including a molding step in which a thermosetting resin composition as set forth in (3) is melted and then molded while impregnating a dry reinforcing fiber base and a curing step in which the thermosetting resin composition molded after impregnating the dry reinforcing fiber base is cured.

We thus provide a thermosetting resin composition for fiber reinforced composite material production and a preform that are high in handleability at room temperature, liable to a less resin loss in the preparation step, and high in reinforcing fiber impregnation efficiency and compositional uniformity and also provides a fiber reinforced composite material produced therefrom.

DETAILED DESCRIPTION

A preferred example is described below.

Our preform for fiber reinforced composite material production includes a thermosetting resin composition and a dry reinforcing fiber base, the thermosetting resin composition being in direct or indirect contact with the surface of the dry reinforcing fiber base. For example, the thermosetting resin composition may exist on the dry reinforcing fiber base, or the dry reinforcing fiber base may exist on the thermosetting resin composition, or they may be stacked. Otherwise, the thermosetting resin and the reinforcing fiber base may be in indirect contact with each other with a film, nonwoven fabric and the like interposed therebetween.

The thermosetting resin composition may be characterized in that when subjected to dynamic viscoelasticity measurement at a traction period of 0.5 Hz while heating at a rate of 1.5° C./min, the temperature change $\Delta T$ is 45° C. or less as the complex viscosity $\eta^*$ decreases from $1\times10^7$ Pa·s to $1\times10^1$ Pa·s. When heated, the thermosetting resin composition can commonly be in the temperature range of 0° C. to 300° C.

If the temperature change $\Delta T$ is 45° C. or less, a fiber reinforced composite material that works efficiently in impregnating reinforcing fibers and that is uniform and free of unevenness after curing can be obtained because the composition can melt uniformly in a short time during compression and heating under conditions suitable for the composition while maintaining a high resin handleability during its setting in a mold.

If the thermosetting resin composition has a complex viscosity $\eta^*$ of $1\times10^7$ Pa·s or more, it indicates that the composition will be high in handleability and the composition will not flow easily. If the complex viscosity $\eta^*$ of the composition is $1\times10^1$ Pa·s or less, on the other hand, it indicates that the composition is high in flowability to ensure sufficient impregnation of the reinforcing fibers.

The thermosetting resin composition is characterized in that the temperature change $\Delta T$ is 45° C. or less, preferably 30° C. or less, and more preferably 20° C. or less, as the complex viscosity $\eta^*$ decreases from $1\times10^7$ Pa·s to $1\times10^1$ Pa·s. If $\Delta T$ is more than 45° C., melting of the resin composition may take a long period of time when heating and pressing it, or the resulting cured product may suffer from compositional unevenness. A smaller $\Delta T$ is more preferable, but practically it is 1° C. or more.

The complex viscosity $\eta^*$ of the thermosetting resin composition can be measured by a dynamic viscoelasticity measuring instrument. A resin sample is set between parallel plates, and the complex viscosity $\eta^*$ is measured commonly while heating at a rate of 1.5° C./min in the temperature range of 0° C. to 300° C. For example, the aforementioned temperature change $\Delta T$ can be determined by heating up at a rate of 1.5° C./min from room temperature or a temperature around 0° C. while measuring the temperature when the complex viscosity $\eta^*$ reaches $1\times10^7$ Pa·s and the temperature when it reaches $1\times10^1$ Pa·s. Commonly, heating to above 300° C. is not needed for this measurement because most thermosetting resin compositions undergo heat decomposition if heated to 300° C.

The complex viscosity $\eta^*$ at 25° C. is preferably $1\times10^7$ Pa·s or more, more preferably $3\times10^7$ Pa·s or more. If the complex viscosity $\eta^*$ at 25° C. is $1\times10^7$ Pa·s or more, the composition will not flow easily at room temperature and will be likely to have high handleability.

It is preferable for these thermosetting resin compositions to contain a base compound and a curing agent, or contain a base compound and a catalyst, or contain a base compound, a curing agent, and a catalyst, and it is preferable for these base compound, curing agent, and catalyst to contain a crystalline component. If the base compound, curing agent, or catalyst contains a crystalline component, the thermosetting resin composition is solid at or below the melting point of the crystalline component and the complex viscosity $\eta^*$ is $1\times10^7$ Pa·s or more whereas the viscosity of the composition rapidly decreases as it is heated to a temperature above the melting point of the crystalline component, allowing the temperature change $\Delta T$ to be controlled at 45° C. or less as the complex viscosity $\eta^*$ decreases from $1\times10^7$ Pa·s to $1\times10^1$ Pa·s.

A crystalline component has a melting point as a single component, and the melting point can be determined by differential scanning calorimetry (DSC) according to JIS K 7121 (2012), as described below.

The thermosetting resin composition may have a single melting point and a heat of fusion of 30 J/g or more.

If the thermosetting resin composition has a single melting point, all components will melt uniformly as it is melted and, accordingly, it works efficiently in impregnating reinforcing fibers, permitting the formation of a molding free of compositional unevenness. If the thermosetting resin composition fails to have a single melting point, the components will start melting in different periods of time in the heat-melting step, making it impossible to obtain a uniform molding.

If the heat of fusion is less than 30 J/g, on the other hand, the thermosetting resin composition before melting fails to be in a completely solid state, leading to a low handleability.

Having a single melting point means showing substantially only one endothermic peak when melting behaviors are examined by DSC, as described below. When DSC gives a very broad, continuously-ranging endothermic peak, it is deemed to show a single melting point if there is only one discrete peak top above the baseline. In addition, the heat of fusion can be calculated from the peak area of the endothermic peak attributed to melting at the melting point determined by DSC.

It is preferable for the thermosetting resin composition to have a heat of fusion of 40 J/g or more, more preferably 50 J/g or more. If the heat of fusion is 40 J/g or more, the thermosetting resin composition before melting will be solid and high in handleability and furthermore, it can work efficiently in impregnating reinforcing fibers because it instantaneously becomes a low viscosity liquid when crystals are melted by heating.

In such a thermosetting resin composition, it is preferable for all crystalline components altogether to account for 70 mass % or more and 100 mass % or less, more preferably 80 mass % or more and 100 mass % or less, and still more preferably 90 mass % or more and 100 mass % or less, relative to 100 mass % of the thermosetting resin composition. When a plurality of different crystalline components are included, the content accounted for by "all crystalline components altogether" means the total content thereof. If all crystalline components altogether account for 70 mass % or more, the thermosetting resin composition will be high in handleability at normal temperature and at the same time, it will work efficiently in impregnating reinforcing fibers when heated to a high temperature.

It is preferable that the thermosetting resin composition contains a plurality of crystalline components each accounting for 10 mass % or more relative to 100 mass % of the thermosetting resin and that the difference in melting point as a single component between the crystalline component highest of all crystalline components in single component melting point and the crystalline component lowest in single component melting point is preferably 60° C. or less, more preferably 50° C. or less, and still more preferably 40° C. or less. If the difference in melting point between these crystalline components is 60° C. or less, all components will tend to start melting simultaneously when the composition is heated and pressed, and the resulting cured product will tend to have high compositional evenness.

Various thermosetting resins that are used generally can be applied to this thermosetting resin composition as long as they meet the desired requirements. Accordingly, thermosetting resins that can be suitably used include, for example, epoxy resin, phenol resin, unsaturated polyester resin, vinyl ester resin, bismaleimide resin, cyanate resin, benzoxazine resin, urethane resin, and urea resin.

The base compound is preferably a monomer component that undergoes a curing reaction to form a crosslinked structure when heated. Preferable base compounds include, for example, thermosetting monomers such as compounds having epoxy groups, compounds having phenol groups, compounds having vinyl groups, compounds having bismaleimide structures, compounds having isocyanate groups, oxazine compounds, compounds having hydroxyl groups, and compounds having amino groups.

Of these thermosetting resins, a thermosetting resin containing an epoxy resin is preferably adopted from the viewpoint of adhesiveness to reinforcing fibers and handleability. If an epoxy resin is contained as the thermosetting resin, the base compound is one having one or more, preferably two or more, epoxy groups in one molecule. Such epoxy resin may be one compound having epoxy groups or a mixture of a plurality of such compounds.

When epoxy resin is contained as the thermosetting resin, specific examples of the base compound, i.e., typical compounds having one or more epoxy groups in one molecule include those epoxy resin compounds that contain epoxy groups as part of glycidyl groups such as aromatic glycidyl ethers derived from a phenol compound having a plurality of hydroxyl groups, aliphatic glycidyl ethers derived from an alcohol compound having a plurality of hydroxyl groups, glycidyl amines derived from an amine compound, and glycidyl esters derived from a carboxylic acid compound having a plurality of carboxyl groups, and other epoxy resin compounds having a structure that contains an oxirane ring formed through oxidation of an unsaturated alicyclic compound such as cyclohexene.

The curing agent is preferably a component that works to cure the thermosetting resin by forming covalent bonds to the base compound.

When the thermosetting resin is epoxy resin, examples of the curing agent include compounds having active groups that can undergo a reaction with epoxy groups. Curing agents can be roughly divided into amine based, phenol based, anhydride based, and mercaptan based curing agents. Examples of the amine based curing agents include dicyandiamide, aromatic polyamine, aliphatic amine, aminobenzoic acid esters, thiourea-added amine, and hydrazide. Examples of the phenolic curing agents include bisphenol, phenol novolac resin, cresol novolac resin, and polyphenol compounds. Examples of the anhydride based curing agents include phthalic anhydride, maleic anhydride, succinic anhydride, and carboxylic anhydride. Examples of the mercaptan based curing agents include polymercaptan and polysulfide resin.

The catalyst is preferably a component that allows the individual curing reaction of the base compound and the curing reaction through bond formation between the base compound and the curing agent to progress quickly and smoothly.

When the thermosetting resin is epoxy resin, examples of the catalyst include various types of imidazole, tertiary amines, organic phosphorus compounds, urea compounds, ammonium salts, and sulfonium salts.

There are no specific limitations on the form of the thermosetting resin composition, and various useful forms include lump, rod, plate, film, fiber, and powder. From the viewpoint of impregnation efficiency, in particular, thermosetting resin compositions in the form of lumps with a size of 1 mm or more in one direction are preferred.

Preferred examples of the dry reinforcing fiber include various organic and inorganic fibers such as glass fiber, aramid fiber, carbon fiber, and boron fiber. In view of producing a fiber reinforced composite material having excellent mechanical properties such as strength and modulus despite the light weight, the use of carbon fiber is preferred.

"Dry reinforcing fibers" means reinforcing fibers that are free of impregnation with matrix resin. Therefore, the preform for fiber reinforced composite material production is different from common preforms that contain reinforcing fibers impregnated with matrix resin. However, the dry reinforcing fibers may contain a small amount of a binder. A binder is a component working to bind the stacked reinforcing fiber base layers, and it is preferably a component containing a non-thermosetting resin that is free of curing agents and catalysts. For the fiber reinforced composite material described below, the reinforcing fibers are not dry because they are in an impregnated state with a resin composition.

The reinforcing fiber may be either a short fiber or a continuous fiber, and both of them may be used together. To obtain a fiber reinforced composite material having a high fiber volume fraction (high Vf), the use of a continuous fiber is preferred.

The dry reinforcing fibers may be in the form of strands, but it is generally preferred to use a dry reinforcing fiber base obtained by processing reinforcing fibers into the form of mat, woven fabric, knit fabric, braid, or one-directionally oriented sheet. In particular, woven fabrics are preferred because they serve to easily obtain a fiber reinforced composite material with a high Vf and they are high in handleability as well.

To allow the fiber reinforced composite material to have a high specific strength or specific elastic modulus, the reinforcing fiber preferably has a fiber volume fraction Vf of 30% to 85% and more preferably 35% to 70%. The fiber volume fraction Vf of the fiber reinforced composite material mentioned here is a value defined as below and measured in conformity with ASTM D3171 (1999). Thus, the value is measured after the dry reinforcing fiber base is impregnated with the thermosetting resin composition followed by curing the composition. Therefore, the fiber volume fraction Vf of the fiber reinforced composite material can be calculated from the thickness h of the fiber reinforced composite material by Expression (1):

$$\text{Fiber volume fraction } Vf(\%) = (Af \times N)/(\rho f \times h \times 10) \quad (1)$$

Af: mass per m$^2$ (g/m$^2$) of a sheet of dry reinforcing fiber base
N: number of stacked sheets of dry reinforcing fiber base (number)
ρf: density of dry reinforcing fiber base (g/cm$^3$)
h: thickness of fiber reinforced composite material (test piece) (mm).

When the mass per m$^2$ of the dry reinforcing fiber base Af, the number of stacked sheets N of the dry reinforcing fiber base, and the density ρf of the dry reinforcing fiber base are not known, the fiber volume fraction in the fiber reinforced composite material can be measured by one of the sulfuric acid decomposition process, nitric acid decomposition process, and the combustion method based on JIS K 7075 (1991). As the density of the reinforcing fiber used in this case, a value measured on the basis of JIS R 7603 (1999) is used.

A preferred concrete measurement method for the thickness h of the fiber reinforced composite material is the use of a micrometer prescribed in JIS B 7502 (1994) or one that is at least comparable to that in accuracy as mentioned in JIS K 7072 (1991). When a fiber reinforced composite material is in a complicated shape and thickness measurement cannot be carried out, it is preferable that samples (samples having certain shape and size for measurement) are cut out from the fiber reinforced composite material to perform measurement.

The fiber reinforced composite material is composed mainly of the dry reinforcing fiber base and a cured product of the thermosetting resin composition, wherein the dry reinforcing fiber base is impregnated with the thermosetting resin composition. Thus, the fiber reinforced composite material can be produced by impregnating the dry reinforcing fiber base with the thermosetting resin composition, and curing the composition after molding.

The method of producing a fiber reinforced composite material includes a molding step in which a thermosetting resin composition is molded while impregnating reinforcing fibers therewith and a curing step in which it is cured to produce a fiber reinforced composite material.

Various techniques such as press molding, film bag molding, and autoclave molding can be used for producing the fiber reinforced composite material. Among these, the press molding method is particularly suitably used from the viewpoint of productivity and the degree of freedom in shape of the molded product.

Preferred processes for film bag molding include, for example, one in which a preform composed mainly of a thermosetting resin composition and a dry reinforcing fiber base is sandwiched between a rigid open mold and a flexible film and vacuum aspiration from the internal space is performed, followed by carrying out heat molding under atmospheric pressure and one in which heat molding is carried out while applying a pressure by supplying gas or liquid.

The method of producing a fiber reinforced composite material will be described below by taking a press molding process as an example. The fiber reinforced composite material can be produced by placing a preform for fiber reinforced composite material production including the thermosetting resin composition and the dry reinforcing fiber base in a mold heated at a specific temperature and heating it under pressure in a press to melt the resin composition and impregnate the reinforcing fiber base, immediately followed by curing.

From the viewpoint of the efficiency in impregnating the dry reinforcing fiber base, the temperature of the mold is preferably not lower than the temperature where the complex viscosity η* of the resin composition used decreases to $1 \times 10^1$ Pa·s.

EXAMPLES

Our materials and methods are described in more detail below with reference to Examples.
Resin Starting Materials
The resin starting materials as described below were used to prepare the thermosetting resin composition in each Example. In Tables 1 and 2, the contents of the resin compositions are expressed in parts by mass unless otherwise specified.
1. Base Compound
jER (registered trademark) YX4000 (manufactured by Mitsubishi Chemical Corporation): crystalline biphenyl type epoxy resin, melting point 105° C.
Denacol (registered trademark) EX-711 (manufactured by Nagase ChemteX Corporation): crystalline terephthalic acid type epoxy resin, melting point 106° C.
YSLV-80DE (manufactured by Nippon Steel & Sumikin Chemical Co., Ltd.): crystalline oxydiphenol type epoxy resin, melting point 79° C.
jER (registered trademark) YL6121H (manufactured by Mitsubishi Chemical Corporation): crystalline biphenyl type epoxy resin, melting point 120° C.
YD-128 (manufactured by Nippon Steel & Sumikin Chemical Co., Ltd.): liquid bisphenol A type epoxy resin, no melting point
jER (registered trademark) 1001 (manufactured by Mitsubishi Chemical Corporation): glassy solid bisphenol A type epoxy resin, no melting point
bisphenol A dimethacrylate (manufactured by Sigma-Aldrich): melting point 73° C.
2,2'-biphenol (manufactured by Tokyo Chemical Industry Co., Ltd.): melting point 107° C.

2. Curing Agent

Rikacid (registered trademark) TH: 1,2,3,6-tetrahydrophthalic anhydride, melting point 101° C. phthalic anhydride (manufactured by Kanto Chemical Co., Inc.): melting point 131° C.
trimellitic anhydride (manufactured by Tokyo Chemical Industry Co., Ltd.): melting point 167° C.
4,4'-diisocyanato-3,3'-dimethyl biphenyl (manufactured by Tokyo Chemical Industry Co., Ltd.): melting point 72° C.
4,4'-dihydroxydiphenyl ether (manufactured by Tokyo Chemical Industry Co., Ltd.): melting point 168° C.
PHENOLITE (registered trademark) TD2091 (manufactured by DIC): phenol novolac, no melting point 3. Curing Catalyst TPP (manufactured by KI Chemical Industry Co., Ltd.): triphenyl phosphine, melting point 80° C.
t-butylbenzoyl peroxide (manufactured by Sigma-Aldrich): liquid, no melting point Preparation of Thermosetting Resin Composition According to the list of materials and their compounding ratios given in Tables 1 and 2, a base compound, curing agent, and curing catalyst were heated and stirred to ensure uniform melting and mixing under temperature and time conditions where curing reaction would not progress substantially, followed by casting and cooling at room temperature to provide a thermosetting resin composition having a predetermined shape.

Measurement of Melting Point of Crystalline Components

The melting point of each resin component used was determined by differential scanning calorimetry (DSC) according to JIS K 7121 (2012). The measuring equipment used was Pyris1 DSC (manufactured by Perkin Elmer). A specimen of a crystalline component is taken on an aluminum sampling pan and measurements are taken at a heating rate of 10° C./min in a nitrogen atmosphere. The temperature at the top of the endothermic peak attributable to melting of the component in the resulting DSC curve was measured as melting point.

Measurement of Viscosity of Thermosetting Resin Composition

A thermosetting resin composition as prepared above was used as a specimen for dynamic viscoelasticity measurement. The measuring apparatus used was ARES-G2 (manufactured by TA Instruments). A specimen was set between 8 mm parallel plates, and measurement was performed under the conditions of an applied traction period of 0.5 Hz, heating rate of 1.5° C./min, and temperature range of 0° C. to 300° C. to determine the complex viscosity η*. The temperature change that occurs as the complex viscosity η* decreases from $1\times10^7$ Pa·s to $1\times10^1$ Pa·s is represented as ΔT.

Measurement of Heat of Fusion of Thermosetting Resin Composition

A thermosetting resin composition as prepared above was used as a specimen for differential scanning calorimetry (DSC) performed according to JIS K 7121 (2012). The measuring equipment used was Pyris1 DSC (manufactured by Perkin Elmer). A specimen of a crystalline component is taken on an aluminum sampling pan and measurements are taken at a heating rate of 10° C./min in a nitrogen atmosphere. The heat of fusion (J/g) was determined from the area of the endothermic peak attributable to melting of the component above the base line in the resulting DSC curve.

Handleability of Thermosetting Resin Composition at Room Temperature

The handleability measurements at room temperature of thermosetting resin compositions as prepared above were compared and evaluated. A specimen was rated as A if free of breakage/deformation by its own weight and stickiness when lifted by a hand, rated as B if suffering from partial breakage by its own weight or slight stickiness, or rated as C if easily suffering from breakage or deformation by its own weight when lifted by a hand or from stickiness.

Manufacture of Fiber Reinforced Composite Material

A fiber reinforced composite material was prepared by the press molding procedure described below. In a mold die having a planar mold cavity of 350 mm×700 mm×2 mm and maintained at a predetermined temperature (molding temperature), a base containing 9 sheets of carbon fiber woven fabric CO6343 (carbon fiber: T300-3K, texture: plain weave, basis weight: 198 $g/m^2$, manufactured by Toray Industries, Inc.), was laid as reinforcing fiber, and 290 g of the thermosetting resin composition prepared above was placed thereon to form a preform. Then, mold clamping was carried out by a press machine. In this step, the internal pressure in the mold was reduced by a vacuum pump to a value lower by 0.1 MPa than atmospheric pressure, followed by pressing under a maximum pressure of 4 MPa. The mold temperature was set at a temperature higher by 10° C. than the highest of the melting points of the crystalline components contained in the thermosetting resin composition. The mold was opened 30 minutes after the start of pressing, and the molded article was removed from the mold to obtain a fiber reinforced composite material.

Resin Impregnating Property for Dry Reinforcing Fiber Base

With regard to the impregnating property in the step for impregnation of reinforcing fibers with resin during the manufacture of a fiber reinforced composite material, comparative evaluation was carried out on the basis of the following three grades with reference to the amount of void in the fiber reinforced composite material.

An impregnating property such that the amount of void in a fiber reinforced composite material was less than 1%, that is, void was substantially not present, was determined as "A," an impregnating property such that an amount of void in the fiber reinforced composite material was greater than or equal to 1% and a not-resin-impregnated portion was not recognized in the external appearance of a fiber reinforced composite material was determined as "B," and an impregnating property such that a not-resin-impregnated portion was recognized in the external appearance of a fiber reinforced composite material was determined as "C."

The amount of void in the fiber reinforced composite material was calculated from an area ratio of the void in the fiber reinforced composite material in the observation of a smoothly polished randomly selected cross section of a smoothly polished fiber reinforced composite material under an epi-illumination type optical microscope.

Compositional Unevenness in Fiber Reinforced Composite Material

With regard to the compositional unevenness in a fiber reinforced composite material as prepared above, comparative evaluation was carried out on the basis of the following three grades. Specimens were cut out from uniformly dispersed 17 or more positions in the resulting fiber reinforced composite material and examined by differential scanning calorimetry (DSC) according to JIS K 7121 (2012) to determine the Tg of the fiber reinforced composite material, and they were rated as "A" if the difference between the largest and the smallest of the measurements was less than 15° C., "B" if it is 15° C. or more and less than 30° C., and "C" if it is 30° C. or more.

Bending Strength of Fiber Reinforced Composite Material

From a fiber reinforced composite material prepared as described above, test pieces with a width of 15 mm and a length of 100 mm were cut out and subjected to three-point bending test using an Instron type universal tester (manufactured by Instron Corporation) according to JIS K7074 (1988) to determine the bending strength. Measurements were taken under the conditions of a crosshead speed of 5 mm/minute, a span of 80 mm, an indenter diameter of 5 mm, and a column diameter of 2 mm to determine the bending strength. Measurements of bending strength were taken from five specimens and converted on the assumption of a fiber content of 60 mass %, followed by calculating the average to represent their bending strength.

Example 1

As shown in Table 1-1, a thermosetting resin composition composed of 100 parts by mass of a crystalline biphenyl type epoxy resin jER (registered trademark) YX4000, 83 parts by mass of 1,2,3,6-tetrahydrophthalic anhydride Rikacid (registered trademark) TH, and 5 parts by mass of triphenyl phosphine TPP was prepared by melting and mixing, followed by quenching to room temperature. This thermosetting resin composition was free of breakage or deformation when lifted by a hand and, accordingly, it was high in handleability at room temperature. The value of $\Delta T$, determined from a measured viscosity of this thermosetting resin composition was a very small 4° C. The heat of fusion of the thermosetting resin composition was sufficiently large and it had a single melting point of 93° C. A fiber reinforced composite material was prepared from a preform containing this thermosetting resin composition and reinforcing fiber and found to contain no unimpregnated portions on the surface and few voids in the interior and accordingly have good impregnating property. Specimens were cut out from uniformly dispersed 17 positions in the fiber reinforced composite material and examined to determine their Tg values, and results showed that the fiber reinforced composite material was uniform and small in positional unevenness and accordingly had good bending strength characteristics.

Examples 2 and 3

Except for using, as base compound, 100 parts by mass of a crystalline terephthalic acid type epoxy resin Denacol (registered trademark) EX-711 (Example 2) or 100 parts by mass of a crystalline oxydiphenol type epoxy resin YSLV-80DE (Example 3) and using, as curing agent, 105 parts by mass (Example 2) or 88 parts by mass (Example 3) of a 1,2,3,6-tetrahydrophthalic anhydride Rikacid (registered trademark) TH to adjust their contents (in parts by mass) to the epoxy equivalent of the epoxy resin used, the same procedure as in Example 1 was carried out. Both thermosetting resin compositions were free of breakage or deformation when lifted by a hand and, accordingly, they were high in handleability at room temperature. The value of $\Delta T$, determined from a measured viscosity of each of these thermosetting resin compositions, was sufficiently small. The heat of fusion of the thermosetting resin compositions was sufficiently large and they had single melting points of 89° C. and 80° C., respectively. Furthermore, the fiber reinforced composite materials produced had good impregnating property and they were uniform fiber reinforced composite materials and had good bending strength characteristics.

Example 4

Except for using 80 parts by mass of phthalic anhydride as curing agent, the same procedure as in Example 1 was carried out. This thermosetting resin composition was free of breakage or deformation when lifted by a hand and, accordingly, it was high in handleability at room temperature. The value of $\Delta T$, determined from a measured viscosity of this thermosetting resin composition, was sufficiently small. The heat of fusion of the thermosetting resin composition was sufficiently large and it had a single melting point of 96° C. Furthermore, the fiber reinforced composite material produced had good impregnating property and it was a uniform fiber reinforced composite material and had good bending strength characteristics.

Example 5

Except for using, as base compound, 100 parts by mass of a crystalline oxydiphenol type epoxy resin YSLV-80DE and using, as curing agent, 85 parts by mass of a phthalic anhydride Rikacid (registered trademark) TH to adjust its content (in parts by mass) to the epoxy equivalent of the epoxy resin used, the same procedure as in Example 4 was carried out. This thermosetting resin composition was free of breakage or deformation when lifted by a hand and, accordingly, it was high in handleability at room temperature. The value of $\Delta T$, determined from a measured viscosity of this thermosetting resin composition, was sufficiently small. The heat of fusion of the thermosetting resin composition was sufficiently large and it had a single melting point of 79° C. Furthermore, the fiber reinforced composite material produced had good impregnating property and it was a sufficiently uniform fiber reinforced composite material and had good bending strength characteristics.

Example 6

Except for using, as base compound, 100 parts by mass of crystalline biphenol type epoxy resin jER (registered trademark) YL6121H and using, as curing agent, 110 parts by mass of trimellitic anhydride, the same procedure as in Example 1 was carried out. This thermosetting resin composition was free of breakage or deformation when lifted by a hand and, accordingly, it was high in handleability at room temperature. The value of $\Delta T$, determined from a measured viscosity of this thermosetting resin composition, was slightly larger compared to Examples 1 to 4. The heat of fusion of the thermosetting resin composition was sufficiently large and it had a single melting point of 101° C. Furthermore, the fiber reinforced composite material produced had good impregnating property and it was a uniform fiber reinforced composite material and had good bending strength characteristics.

Example 7

As shown in Table 1-1, a thermosetting resin composition composed of 85 parts by mass of crystalline terephthalic acid type epoxy resin Denacol (registered trademark) EX-711, 15 parts by mass of glassy solid bisphenol A type epoxy resin jER (registered trademark) 1001, 94 parts by mass of 1,2,3,6-tetrahydrophthalic anhydride Rikacid (registered trademark) TH, and 5 parts by mass of triphenyl phosphine TPP was prepared by melting and mixing, followed by quenching to room temperature. This thermosetting resin composition was free of breakage or deformation when lifted by a hand and, accordingly, it was high in handleability at room temperature. The value of ΔT, determined from a measured viscosity of this thermosetting resin composition, was sufficiently small. The heat of fusion of the thermosetting resin composition was sufficiently large, though slightly smaller compared to Examples 1 to 6, and it had a single melting point of 86° C. Furthermore, the fiber reinforced composite material produced had good impregnating property and it was a uniform fiber reinforced composite material and had good bending strength characteristics.

Examples 8 and 9

Except for using, as base compound, 65 parts by mass and 35 parts by mass, respectively, of a crystalline terephthalic acid type epoxy resin Denacol (registered trademark) EX-711 and a glassy solid bisphenol A type epoxy resin jER (registered trademark) 1001 in Example 8 and 50 parts by mass and 50 parts by mass, respectively, of them in Example 9, and using, as curing agent, 79 parts by mass (Example 8) or 69 parts by mass (Example 9) of a 1,2,3,6-tetrahydrophthalic anhydride Rikacid (registered trademark) TH to adjust its content (in parts by mass) to the epoxy equivalent of the epoxy resin used, the same procedure as in Example 7 was carried out. The heat of fusion of the thermosetting resin compositions was sufficiently large, although still smaller compared to Example 7, and they had single melting points of 85° C. and 82° C., respectively. Both thermosetting resin compositions were free of breakage or deformation when lifted by a hand and, accordingly, they were high in handleability at room temperature. The value of ΔT, determined from a measured viscosity of each of these thermosetting resin composition, was sufficiently small. Furthermore, the fiber reinforced composite material produced was a uniform fiber reinforced composite material and had good bending strength characteristics.

Example 10

As shown in Table 1-2, a thermosetting resin composition composed of 50 parts by mass of crystalline terephthalic acid type epoxy resin Denacol (registered trademark) EX-711, 50 parts by mass of liquid bisphenol A type epoxy resin YD128, 93 parts by mass of 1,2,3,6-tetrahydrophthalic anhydride Rikacid (registered trademark) TH, and 5 parts by mass of triphenyl phosphine TPP was prepared by melting and mixing, followed by quenching to room temperature. This thermosetting resin composition was free of breakage or deformation when lifted by a hand. The value of ΔT, determined from a measured viscosity of this thermosetting resin composition, was sufficiently small. The heat of fusion of the thermosetting resin composition was sufficiently large and it had a single melting point of 80° C. Furthermore, the fiber reinforced composite material produced had good impregnating property and it was a uniform fiber reinforced composite material and had good bending strength characteristics.

Example 11

Except for using, as the thermosetting resin, vinyl ester resin, namely, 100 parts by mass of crystalline bisphenol A dimethacrylate and 1.5 parts by mass of t-butylbenzoyl peroxide as shown in Table 1-2, the same procedure as in Example 1 was carried out. This thermosetting resin composition was free of breakage or deformation when lifted by a hand and, accordingly, it was high in handleability at room temperature. The value of ΔT, determined from a measured viscosity of this thermosetting resin composition, was very small. The heat of fusion of the thermosetting resin composition was sufficiently large and it had a single melting point of 73° C. Furthermore, the fiber reinforced composite material produced had good impregnating property and it was a sufficiently uniform fiber reinforced composite material and had sufficiently high bending strength.

Example 12

Except for using, as the thermosetting resin, polyurethane resin, namely, 100 parts by mass of 2,2'-biphenol, which is crystalline, 142 parts by mass of 4,4'-diisocyanato-3,3'-dimethyl biphenyl, which is crystalline, and 5 parts by mass of triphenyl phosphine "TPP" as shown in Table 1-2, the same procedure as in Example 1 was carried out. This thermosetting resin composition was free of breakage or deformation when lifted by a hand and, accordingly, it was high in handleability at room temperature. The value of ΔT, determined from a measured viscosity of this thermosetting resin composition, was sufficiently small. The heat of fusion of the thermosetting resin composition was sufficiently large and it had a single melting point of 79° C. Furthermore, the fiber reinforced composite material produced had good impregnating property and it was a sufficiently uniform fiber reinforced composite material, though it was not sufficiently high in bending strength.

Comparative Example 1

As shown in Table 2, a thermosetting resin composition composed of 100 parts by mass of crystalline oxydiphenol type epoxy resin YSLV-80DE, 58 parts by mass of 4,4'-dihydroxydiphenyl ether, and 5 parts by mass of triphenyl phosphine TPP was prepared by melting and mixing, followed by quenching to room temperature. This thermosetting resin composition was free of breakage or deformation when lifted by a hand and, accordingly, it was high in handleability at room temperature. The value of ΔT, determined from a measured viscosity of this thermosetting resin composition, was large. In addition, the thermosetting resin composition had a sufficiently large heat of fusion, but showed two separated melting peaks, instead of a single melting point, and a fiber reinforced composite material produced from a preform prepared from a combination of this thermosetting resin composition and reinforcing fiber contained a significant number of internal voids. Specimens were cut out from uniformly dispersed 17 positions in the fiber reinforced composite material to take Tg measurements, and results showed a large positional unevenness. Furthermore, it had a sufficiently large bending strength.

Comparative Example 2

As shown in Table 2, a thermosetting resin composition composed of 100 parts by mass of crystalline biphenyl type epoxy resin jER (registered trademark) YX4000, 77 parts by mass of phenol novolac TD2091, and 5 parts by mass of triphenyl phosphine TPP was prepared by melting and mixing, followed by quenching to room temperature. This thermosetting resin composition was free of breakage or deformation when lifted by a hand and, accordingly, it was high in handleability at room temperature. The value of ΔT, determined from a measured viscosity of this thermosetting resin composition, was large and the heat of fusion was small. The resulting fiber reinforced composite material had unimpregnated portions in the surface.

Comparative Example 3

As shown in Table 2, a thermosetting resin composition composed of 20 parts by mass of crystalline biphenyl type epoxy resin jER (registered trademark) YX4000, 80 parts by mass of liquid bisphenol type epoxy YD128, 86 parts by mass of 1,2,3,6-tetrahydrophthalic anhydride Rikacid (registered trademark) TH, and 5 parts by mass of triphenyl phosphine TPP was prepared by melting and mixing, followed by quenching to room temperature. This thermosetting resin composition was suffered from a significantly large deformation when lifted by a hand, with some resin stuck on the hand. The viscosity examination of this thermosetting resin composition showed that all viscosity measurements taken in the temperature range of 0° C. to 300° C. were not more than $1\times10^7$.

TABEL 1-1

| | | | Melting point [° C.] | Example 1 | Example 2 | Example 3 | Example 4 | Example 5 | Example 6 | Example 7 |
|---|---|---|---|---|---|---|---|---|---|---|
| Base compound | crystalline biphenyl type epoxy resin | YX4000 | 105 | 100 | | | 100 | | | |
| | crystalline terephthalic acid type epoxy resin | EX-711 | 106 | | 100 | | | | | 85 |
| | crystalline oxydiphenol type epoxy resin | YSLV-80DE | 79 | | | 100 | | 100 | | |
| | crystalline biphenyl type epoxy resin | YL6121H | 120 | | | | | | 100 | |
| | liquid bisphenol A type epoxy resin | YD-128 | — | | | | | | | |
| | solid bisphenol A type epoxy resin | jER1001 | — | | | | | | | 15 |
| | bisphenol A dimethacrylate | | 73 | | | | | | | |
| | 2,2'-biphenol | | 107 | | | | | | | |
| Curing agent | 1,2,3,6-tetrahydrophthalic anhydride | TH | 101 | 83 | 105 | 88 | | | | 94 |
| | phthalic anhydride | | 131 | | | | 80 | 85 | | |
| | anhydride trimellitic acid | | 167 | | | | | | 110 | |
| | 4,4'-diisocyanato-3,3'-dimethyl biphenyl | | 72 | | | | | | | |
| Curing catalyst | triphenyl phosphine | TPP | 80 | 5 | 5 | 5 | 5 | 5 | 5 | 5 |
| | t-butyl benzoyl peroxide | | — | | | | | | | |
| Resin characteristics | crystalline component content [mass %] | | | 100 | 100 | 100 | 100 | 100 | 100 | 92 |
| | difference in single component melting point [° C.] | | | 4 | 5 | 22 | 26 | 52 | 47 | 5 |
| | ΔT [° C.] | | | 4 | 4 | 10 | 16 | 38 | 30 | 9 |
| | heat of fusion [J/g] | | | 65 | 70 | 67 | 67 | 68 | 70 | 62 |
| | handleability | | | A | A | A | A | A | A | A |
| Composite material characteristics | impregnation efficiency | | | A | A | A | A | A | A | A |
| | compositional unevenness | | | A | A | A | A | B | A | A |
| | bending strength [MPa] | | | 910 | 920 | 900 | 890 | 830 | 860 | 880 |

TABEL 1-2

| | | | Melting point [° C.] | Example 8 | Example 9 | Example 10 | Example 11 | Example 12 |
|---|---|---|---|---|---|---|---|---|
| Base compound | crystalline biphenyl type epoxy resin | YX4000 | 105 | | | | | |
| | crystalline terephthalic acid type epoxy resin | EX-711 | 106 | 65 | 50 | 50 | | |
| | crystalline oxydiphenol type epoxy resin | YSLV-80DE | 79 | | | | | |
| | crystalline biphenyl type epoxy resin | YL6121H | 120 | | | 50 | | |
| | liquid bisphenol A type epoxy resin | YD-128 | — | | | | 50 | |
| | solid bisphenol A type epoxy resin | jER1001 | — | 35 | 50 | | | |
| | bisphenol A dimethacrylate | | 73 | | | | 100 | |
| | 2,2'-biphenol | | 107 | | | | | 100 |
| Curing agent | 1,2,3,6-tetrahydrophthalic anhydride | TH | 101 | 79 | 69 | 93 | | |
| | phthalic anhydride | | 131 | | | | | |
| | anhydride trimellitic acid | | 167 | | | | | |
| | 4,4'-diisocyanato-3,3'-dimethyl biphenyl | | 72 | | | | | 142 |
| Curing catalyst | triphenyl phosphine | TPP | 80 | 5 | 5 | 5 | | 5 |
| | t-butyl benzoyl peroxide | | — | | | | 1.5 | |
| Resin characteristics | crystalline component content [mass %] | | | 81 | 71 | 75 | 99 | 100 |
| | difference in single component melting point ° C.] | | | 5 | 5 | 5 | 0 | 25 |
| | ΔT [° C.] | | | 18 | 29 | 27 | 3 | 14 |
| | Heat of fusion [J/g] | | | 53 | 37 | 40 | 59 | 56 |
| | handleability | | | A | A | B | A | A |
| Composite material characteristics | impregnation efficiency | | | B | B | A | A | A |
| | compositional unevenness | | | A | A | A | B | A |
| | bending strength [MPa] | | | 840 | 790 | 850 | 620 | 190 |

TABLE 2

|  |  |  | Melting point [° C.] | Comparative Example 1 | Comparative Example 2 | Comparative Example 3 |
|---|---|---|---|---|---|---|
| Base compound | crystalline biphenyl type epoxy resin | YX4000 | 105 |  | 100 |  |
|  | crystalline terephthalic acid type epoxy resin | EX-711 | 106 |  |  | 20 |
|  | liquid bisphenol A type epoxy resin | YD128 | — |  |  | 80 |
|  | crystalline oxydiphenol type epoxy resin | YSLV-80DE | 79 | 100 |  |  |
| Curing agent | 1,2,3,6-tetrahydrophthalic anhydride | TH | 101 |  |  | 86 |
|  | 4,4'-dihydroxy diphenyl ether |  | 168 | 58 |  |  |
|  | phenol novolac | TD2091 | — |  | 77 |  |
| Curing catalyst | triphenyl phosphine | TPP | 80 | 5 | 5 | 5 |
| Resin characteristics | crystalline component content [%] |  |  | 100 | 57 | 59 |
|  | difference in single component melting point [° C.] |  |  | 89 | 0 | 4 |
|  | ΔT [° C.] |  |  | 48 | 57 | — |
|  | heat of fusion [J/g] |  |  | 68 | 19 | 15 |
|  | handleability |  |  | A | A | C |
| Composite material characteristics | impregnation efficiency |  |  | B | C | A |
|  | compositional unevenness |  |  | C | B | A |
|  | bending strength |  |  | 640 | 600 | 790 |

INDUSTRIAL APPLICABILITY

The thermosetting resin composition is high in handleability at room temperature and no additional materials are required for resin preparation, permitting a decreased resin loss, high reinforcing fiber impregnation efficiency, and a high resin compositional evenness in the resulting cured products. Therefore, it produces high-quality fiber reinforced composite materials by press molding and the like in a simple, high-productivity process. Accordingly, an increased use of fiber reinforced composite materials in the automobile and aircraft industries is expected, leading to the improvement of their fuel efficiency due to decreased weights and contribution to reduction of the greenhouse gas emission.

The invention claimed is:

1. A preform for fiber reinforced composite material production comprising a thermosetting resin composition and a dry reinforcing fiber base that comprises a stack of carbon fiber woven fabrics, the thermosetting resin composition characterized in that when subjected to dynamic viscoelasticity measurement at a traction period of 0.5 Hz while heating at a rate of 1.5° C./min, a temperature change ΔT is 45° C. or less as complex viscosity η* decreases from $1 \times 10^7$ Pa·s to $1 \times 10^1$ Pa·s, and thermosetting resin composition in the form of lumps with a size of 1 mm or more in one direction.

2. The preform as set forth in claim 1, wherein
the thermosetting resin composition contains a base compound and a curing agent, or contains a base compound and a catalyst, or contains a base compound, a curing agent, and a catalyst, and
total content of the crystalline components is 70 mass % or more in 100 mass % of the thermosetting resin composition.

3. The preform as set forth in claim 2, wherein
the thermosetting resin composition contains a base compound and a curing agent, or contains a base compound and a catalyst, or contains a base compound, a curing agent, and a catalyst, and
a plurality of crystalline components each accounting for 10 mass % or more are present in 100 mass % of the thermosetting resin, a difference in single component melting point between the crystalline component highest of all crystalline components in single component melting point and the crystalline component lowest in single component melting point being 60° C. or less.

4. The thermosetting resin composition production as set forth in claim 2 that forms a preform for fiber reinforced composite material production and includes a dry reinforcing fiber base.

5. The preform as set forth in claim 1, wherein
the thermosetting resin composition contains a base compound and a curing agent, or contains a base compound and a catalyst, or contains a base compound, a curing agent, and a catalyst, and
a plurality of crystalline components each accounting for 10 mass % or more are present in 100 mass % of the thermosetting resin, a difference in single component melting point between the crystalline component highest of all crystalline components in single component melting point and the crystalline component lowest in single component melting point being 60° C. or less.

6. The thermosetting resin composition production as set forth in claim 5 that forms a preform for fiber reinforced composite material production and includes a dry reinforcing fiber base.

7. The thermosetting resin composition production as set forth in claim 1 that forms a preform for fiber reinforced composite material production and includes a dry reinforcing fiber base.

8. A fiber reinforced composite material comprising a dry reinforcing fiber base impregnated with the thermosetting resin composition as set forth in claim 7, wherein the thermosetting resin composition is in a cured state.

9. A method of producing a fiber reinforced composite material comprising a molding step in which the thermosetting resin composition as set forth in claim 7 is melted and then molded while impregnating a dry reinforcing fiber base and a curing step in which the thermosetting resin composition molded after impregnating the dry reinforcing fiber base is cured.

10. A preform for fiber reinforced composite material production comprising a thermosetting resin composition and a dry reinforcing fiber base that comprises a stack of carbon fiber woven fabrics, the thermosetting resin composition having a single melting point and a heat of fusion of 30 J/g or more.

11. The preform as set forth in claim 10, wherein
the thermosetting resin composition contains a base compound and a curing agent, or contains a base compound and a catalyst, or contains a base compound, a curing agent, and a catalyst, and total content of the crystalline components is 70 mass % or more in 100 mass % of the thermosetting resin composition.

12. The preform as set forth in claim 10, wherein
the thermosetting resin composition contains a base compound and a curing agent, or contains a base compound and a catalyst, or contains a base compound, a curing agent, and a catalyst, and
a plurality of crystalline components each accounting for 10 mass % or more are present in 100 mass % of the thermosetting resin, a difference in single component melting point between the crystalline component highest of all crystalline components in single component melting point and the crystalline component lowest in single component melting point being 60° C. or less.

13. The thermosetting resin composition production as set forth in claim 10 that forms a preform for fiber reinforced composite material production and includes a dry reinforcing fiber base.

\* \* \* \* \*